(12) United States Patent
Chandra et al.

(10) Patent No.: US 8,423,350 B1
(45) Date of Patent: Apr. 16, 2013

(54) SEGMENTING TEXT FOR SEARCHING

(75) Inventors: Sunil Chandra, Bangalore (IN);
Harshit Chopra, Bangalore (IN);
Siddaarth Shanmugam, Bangalore (IN)

(73) Assignee: Google Inc., Mountain View, CA (US)

( * ) Notice: Subject to any disclaimer, the term of this patent is extended or adjusted under 35 U.S.C. 154(b) by 899 days.

(21) Appl. No.: 12/470,394

(22) Filed: May 21, 2009

(51) Int. Cl.
*G06F 17/27* (2006.01)

(52) U.S. Cl.
USPC .............. 704/9; 704/1; 704/10; 704/2; 704/8; 435/5; 706/45; 707/742; 707/468; 715/206; 715/256; 725/35

(58) Field of Classification Search .................. 707/768, 707/999.101, 742; 706/45; 435/5; 704/1, 704/704, 8, 9, 2; 715/206, 256; 725/35
See application file for complete search history.

(56) References Cited

U.S. PATENT DOCUMENTS

| | | | | |
|---|---|---|---|---|
| 4,706,212 A | * | 11/1987 | Toma | 704/2 |
| 5,706,496 A | * | 1/1998 | Noguchi et al. | 1/1 |
| 5,835,888 A | * | 11/1998 | Kanevsky et al. | 704/9 |
| 5,937,422 A | * | 8/1999 | Nelson et al. | 715/206 |
| 5,946,648 A | * | 8/1999 | Halstead et al. | 704/9 |
| 6,405,161 B1 | * | 6/2002 | Goldsmith | 704/9 |
| 6,928,404 B1 | * | 8/2005 | Gopalakrishnan et al. | 704/10 |
| 7,792,840 B2 | * | 9/2010 | Whang et al. | 707/742 |
| 7,925,498 B1 | * | 4/2011 | Baker et al. | 704/9 |
| 8,255,948 B1 | * | 8/2012 | Black et al. | 725/35 |
| 2004/0044952 A1 | * | 3/2004 | Jiang et al. | 715/500 |
| 2005/0112577 A1 | * | 5/2005 | Uemura et al. | 435/6 |
| 2005/0143972 A1 | * | 6/2005 | Gopalakrishnan et al. | 704/10 |
| 2009/0030862 A1 | * | 1/2009 | King et al. | 706/45 |
| 2009/0043797 A1 | * | 2/2009 | Dorie et al. | 707/101 |
| 2009/0157382 A1 | * | 6/2009 | Bar | 704/8 |
| 2009/0193011 A1 | * | 7/2009 | Blair-Goldensohn et al. | 707/5 |
| 2010/0076745 A1 | * | 3/2010 | Oda | 704/1 |
| 2010/0198857 A1 | * | 8/2010 | Metzler et al. | 707/768 |

* cited by examiner

*Primary Examiner* — Michael Colucci
(74) *Attorney, Agent, or Firm* — Remarck Law Group PLC

(57) ABSTRACT

Methods, systems, and apparatus, including computer program products, for segmenting text for searching are disclosed. In one implementation, a method is provided. The method includes receiving text; segmenting the text into one or more unigrams; filtering the one or more unigrams to identify one or more core unigrams; and generating a searchable resource, including: for each of the one or more core unigrams: identifying a stem, indexing the stem, and associating one or more second n-grams with the indexed stem. Each of the one or more second n-grams is derived from the text and includes a core unigram that is related to the indexed stem.

20 Claims, 6 Drawing Sheets

SEGMENTING TEXT FOR SEARCHING

BACKGROUND

This specification relates to segmenting text for searching.

An n-gram is a sequence of n consecutive tokens, e.g., words or characters. An n-gram has an order, which is a number of tokens in the n-gram. For example, a 1-gram (or unigram) includes one token; a 2-gram (or bi-gram) includes two tokens.

Conventional techniques that segment text for searching (e.g., searching searchable resources, hereinafter also referred to as resources, including, for example, glossaries or dictionaries) segment an n-gram into every lesser order n-gram of the n-gram. The lesser order n-grams are search candidates (e.g., queries) for the search. Lesser order n-grams are derived from the n-gram. For example, for an n-gram "abc" (a 3-gram including tokens, "a", "b", and "c"), the lesser order n-grams include: "a", "b", "c", "ab", and "bc".

As another example, suppose a sentence is: "Alleged scientist says he will spill the beans." Conventional techniques of searching a glossary, for example, segment the sentence into every word and phrase that can be derived from the sentence. In particular, the sentence would be segmented into the following n-grams: "alleged", "scientist", "says", "he", "will", "spill", "the", "beans", "alleged scientist", "scientist says", "says he", "he will", "will spill", "spill the", "the beans", "alleged scientist says", "scientist says he", "says he will", "he will spill", "will spill the", "spill the beans", "alleged scientist says he", "scientist says he will", "says he will spill", "he will spill the", "will spill the beans", "alleged scientist says he will", "scientist says he will spill", "says he will spill the", "he will spill the beans", "alleged scientist says he will spill", "scientist says he will spill the", "says he will spill the beans", "alleged scientist says he will spill the", "scientist says he will spill the beans", and "alleged scientist says he will spill the beans".

In the example, each of the n-grams is used as a query to search for matches in the glossary, or in some implementations, to build an index in a glossary. Segmenting the n-grams using conventional techniques can be represented by an algorithm of order of $n^2$ time complexity, or $O(n^2)$. Many of the typical segmentations consist of combinations of words (e.g., phrases) that are unlikely to be found in the glossary. In practice, for example, "scientist says he will spill the" is a phrase that is unlikely to be found in a glossary or be useful as an entry in a glossary, whereas "spill the beans" is more likely to be found in a glossary or be useful as an entry in a glossary.

Furthermore, in practice, the phrases "spill the beans" and "spilled the beans" should be associated with a same entry in a glossary, whereas the phrase "spill the bean" should not be associated with the same entry. To address these types of situations, conventional techniques may treat stems of a word as the same. For example, the stem of "spilled" is "spill", and the stem of "beans" is "bean". As a result, conventional techniques may process the phrase "spilled the beans" to produce the phrase "spill the bean", by mapping "spilled" to "spill" and "beans" to "bean". However, a mapping of "spilled the beans" to "spill the bean" would result in "spilled the beans" being associated with a glossary entry "spill the bean", when they should not be associated.

SUMMARY

This specification describes technologies relating to searching.

In general, one aspect of the subject matter described in this specification can be embodied in methods that include the actions of receiving text; segmenting the text into one or more unigrams; filtering the one or more unigrams to identify one or more core unigrams; and generating a searchable resource, including: for each of the one or more core unigrams: identifying a stem, indexing the stem, and associating one or more second n-grams with the indexed stem, where each of the one or more second n-grams is derived from the text and includes a core unigram that is related to the indexed stem. Other embodiments of this aspect include corresponding systems, apparatus, and computer program products.

These and other embodiments can optionally include one or more of the following features. A unigram includes a term. An n-gram includes a sequence of one or more terms. The method further includes associating content with the one or more second n-grams. The content includes an image, audio, video, text, or a document.

In general, another aspect of the subject matter described in this specification can be embodied in methods that include the actions of receiving text; segmenting the text into one or more unigrams; filtering the one or more unigrams to identify one or more core unigrams; for each of the one or more core unigrams: identifying a stem, searching an index to identify one or more second n-grams that are related to the stem, and comparing the one or more second n-grams to the text to identify a group of the one or more second n-grams that are included in the text; searching a resource for each n-gram in the group; and providing content associated with each of the n-grams found in the resource. Other embodiments of this aspect include corresponding systems, apparatus, and computer program products.

These and other embodiments can optionally include one or more of the following features. The resource is a glossary. The resource is a dictionary. The content includes an image, audio, video, text, or a document. The method further includes removing duplicates of each of the one or more second n-grams before comparing the one or more second n-grams to the text. The method further includes stemming the text before comparing the one or more second n-grams to the text.

Particular embodiments of the subject matter described in this specification can be implemented to realize one or more of the following advantages. Segmenting n-grams into one or more unigrams for searching can reduce a number of segmentations thereby: (i) increasing an efficiency of searching (e.g., from $O(n^2)$ to $O(n)$); and (ii) increasing an efficiency of generating a resource (e.g., a glossary or dictionary) by reducing unlikely entry candidates.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
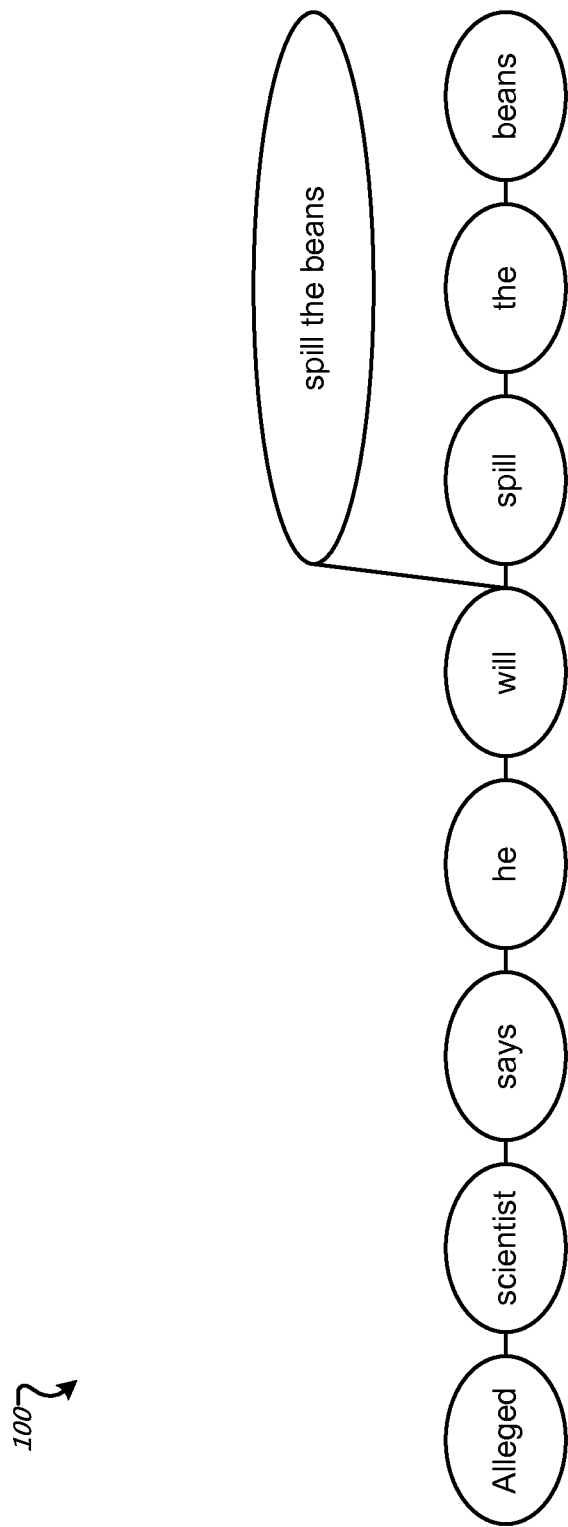
FIG. 1 is a block diagram illustrating an example model for an observed sequence of terms.

FIG. 1 is a block diagram illustrating an example model for an observed sequence 100 of terms. In particular, the observed sequence 100 can be a sentence: "Alleged scientist says he will spill the beans." The sentence includes stop-words, e.g., common unigrams that are not likely to have a corresponding entry in a glossary. In some implementations, the sentence is processed to remove the stop-words. For example, a list of stop-words can be used to identify and filter out the stop-words. The remaining unigrams can be used to generate an index or used to search an existing index of a resource (e.g., a glossary or a dictionary).

As shown in FIG. 1, the example sentence includes the unigrams "alleged", "scientist", "says", "he", "will", "spill", "the", and "beans". In the sentence, the stop-words can be identified as the unigrams "says", "he", "will", and "the" by using a stop list, for example. The identification can be made based on a relative frequency that a unigram occurs in training data. Typically, as the relative frequency of the unigram occurring in training data increases, a likelihood that the unigram is so common as not to be useful in a glossary or dictionary increases. The remaining unigrams "alleged", "scientist", "spill", and "beans" can be identified as core n-grams because they are more likely to have corresponding entries in a resource (e.g., phrases in a glossary) than the stop-words. Because the unigrams that are identified as stop-words are less likely to be useful (e.g., found or searched for in a resource), they can be excluded from use in generating or searching an index of the resource.

The resource can be implemented in various searchable data structures.

Figure 2:
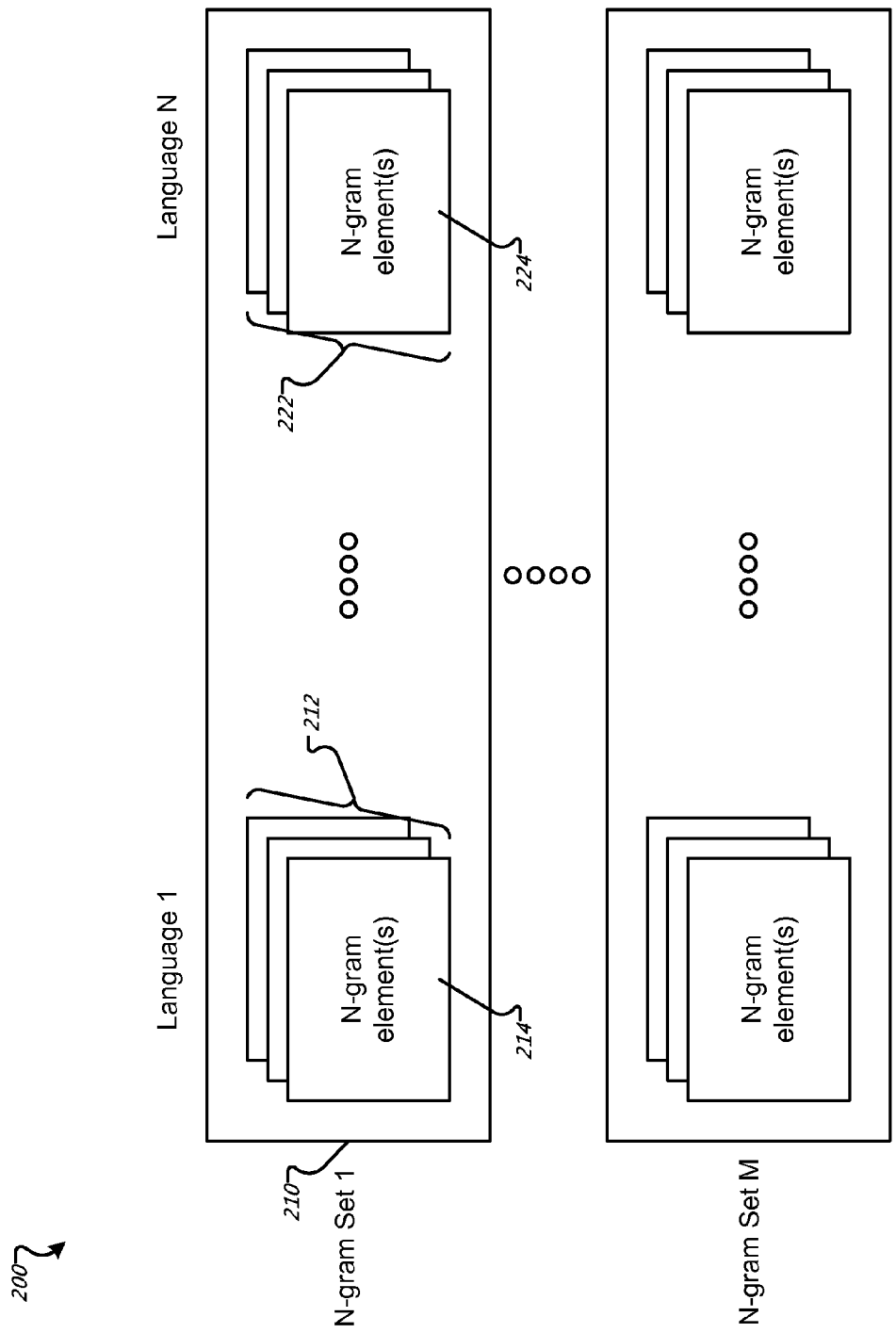
FIG. 2 is a block diagram illustrating an example data structure that includes n-gram sets and related n-gram subsets.

FIG. 2 is a block diagram illustrating an example data structure 200 (e.g., one or more tables for a glossary or a dictionary) that includes n-gram sets 210 (e.g., term sets) and related n-gram subsets 212 and 222 (e.g., term subsets). In some implementations, the table is implemented as a Bigtable as described in further detail in Chang et al., *Bigtable: A Distributed Storage System for Structured Data*, 7th USENIX Symposium on Operating Systems Design and Implementation (OSDI '06), Nov. 6-8 2006, Seattle, Wash., USENIX Association 2006, pp. 205-218.

As an overview, the data structure 200 can include multiple rows that are indexed by a row key. A row key can be a string of text generated and indexed by a hash technique, for example. Each row corresponds to an n-gram set (e.g., n-gram set 210). Each row includes one or more columns. Each column can include a protocol buffer that includes an n-gram subset that is associated with a single language. A protocol buffer is a language and platform neutral, extensible technique for serializing structured data (e.g., by encoding structured data according to Google's data interchange format, Protocol Buffers, as described in further detail in *Google Code: Protocol Buffers*, available at http://code.google.com/p/protobuf/).

N-gram set 210 can include n-gram subsets that each include terms in a different language. For example, n-gram set 210 includes an n-gram subset 212 that includes terms (e.g., n-grams) that are in English and n-gram subset 222 that includes terms that are in Hindi. Furthermore, each term in the n-gram subset 212 is a synonym of each of the other terms in the n-gram subset 212, in a first language, and each term in the n-gram subset 222 is a synonym of each of the other terms in the n-gram subset 222, in a second language, for example.

Other implementations of the data structure 200 are possible. For example, the implementation described previously can be considered a three-level hierarchy, where the three levels are represented by n-gram sets (1) that include n-gram subsets (2), which further include n-gram elements (3). In some implementations, a two-level hierarchy is used. For example, the data structure 200 can include two levels: an n-gram set (1), e.g., n-gram set 210; and n-gram elements (2), e.g., n-gram elements 214 and 224. In the example, n-gram elements 214 and 224 can be associated with synonyms (e.g., "left" and "remaining").

Each n-gram element (e.g., n-gram element 214, or n-gram element 224) can include information related to an n-gram, as described below.

Figure 3:
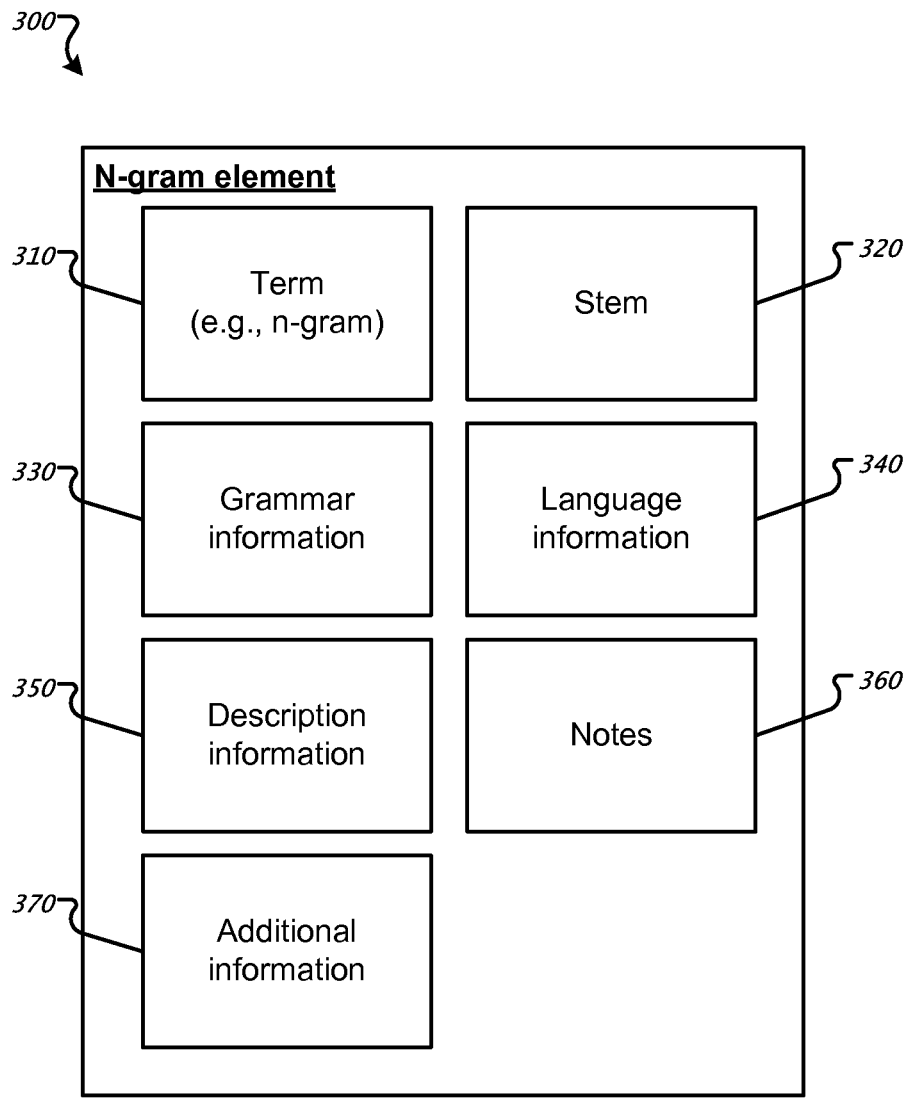
FIG. 3 is a block diagram illustrating an example n-gram element.

FIG. 3 is a block diagram illustrating an example n-gram element 300 (e.g., n-gram element 214). The n-gram element 300 can correspond to a glossary entry or a dictionary entry (e.g., for a term). In particular, the n-gram element 300 includes a term 310 (e.g., an n-gram), a stem 320, grammar information 330, language information 340, description information 350, and notes 360.

The term 310 is an n-gram that occurs in an observed sequence of terms (e.g., the observed sequence 100). For example, the term 310 can be an n-gram "accounts". The stem 320 is a stem that is related to the term 310. For example, the stem 320 can be the n-gram "account". As another example, a stem of a phrase (or an n-gram with multiple words) can be an ordered sequence of stems of each of the individual words in the phrase.

The grammar information 330 can be used to distinguish between different linguistic categories that the term 310 may belong to. For example, "accounts" can be a noun or a verb. An n-gram set can be generated for each linguistic category that the term 310 belongs to. For example, a first n-gram set can be associated with the noun "accounts", and a second n-gram set can be associated with the verb "accounts". Using separate n-gram sets can be advantageous because the noun and verb "accounts" (and the related stem "account") can be associated with different n-grams in different languages. The grammar information 330 can include a part-of-speech (POS) tag to indicate the POS.

The language information 340 can be used to indicate the language of the term 310. For example, a tag "en-US" can be used to indicate that a term "elevator" represents an English word as it is used in the United States. As another example, a tag "en-UK" can be used to indicate that a term "lift" (e.g., a synonym for "elevator") represents an English word as it is used in the United Kingdom. The n-gram element 300 can also include description information 350 and notes 360. The description information 350 can be any information that describes the term 310. For example, a user can provide the description information 350. The notes 360 include any information that a user provides to be associated with the n-gram element 300. For example, the notes 360 can be indicative information that is used by a translator. An example of indicative information is a note to the translator stating that "'account' in English may be translated to 'on account of' in Grund (German) or 'bank account' in Konto (German)".

The n-gram element 300 also includes additional information 370 (or content). The type of the additional information 370 can depend on the resource that the data structure represents. For example, if the resource is a dictionary, the additional information 370 can include one or more definitions of the term 310. As another example, if the resource is a glossary, the additional information 370 can include content that is related to the term 310, e.g., images, audio, video, text, or documents.

In some implementations, a second data structure (e.g., Bigtable) is used as an index for one or more first data structures (e.g., data structure 200). The second data structure can be used to "reverse map" a unigram (e.g., a term from an observed sequence of terms) to one or more row keys of one or more first data structures. The second data structure can be a table of cells that is indexed by unigrams in an n-gram. Each cell can include a protocol buffer that includes one or more row keys that identify n-gram elements in the one or more first data structures. In some implementations, each cell also includes scope information that defines the scope of a search (e.g., data hierarchies that should be searched).

Other implementations are possible. For example, other types of data structures (e.g., linear and non-linear data structures) can be used to store the information. In addition, in some implementations, a single data structure (e.g., one Bigtable) is used to store the information instead of a separate first data structure and second data structure.

The first data structure and second data structure can be generated using information obtained from training data (e.g., text data), for example. The training data can include a sequence of one or more n-grams.

Figure 4:
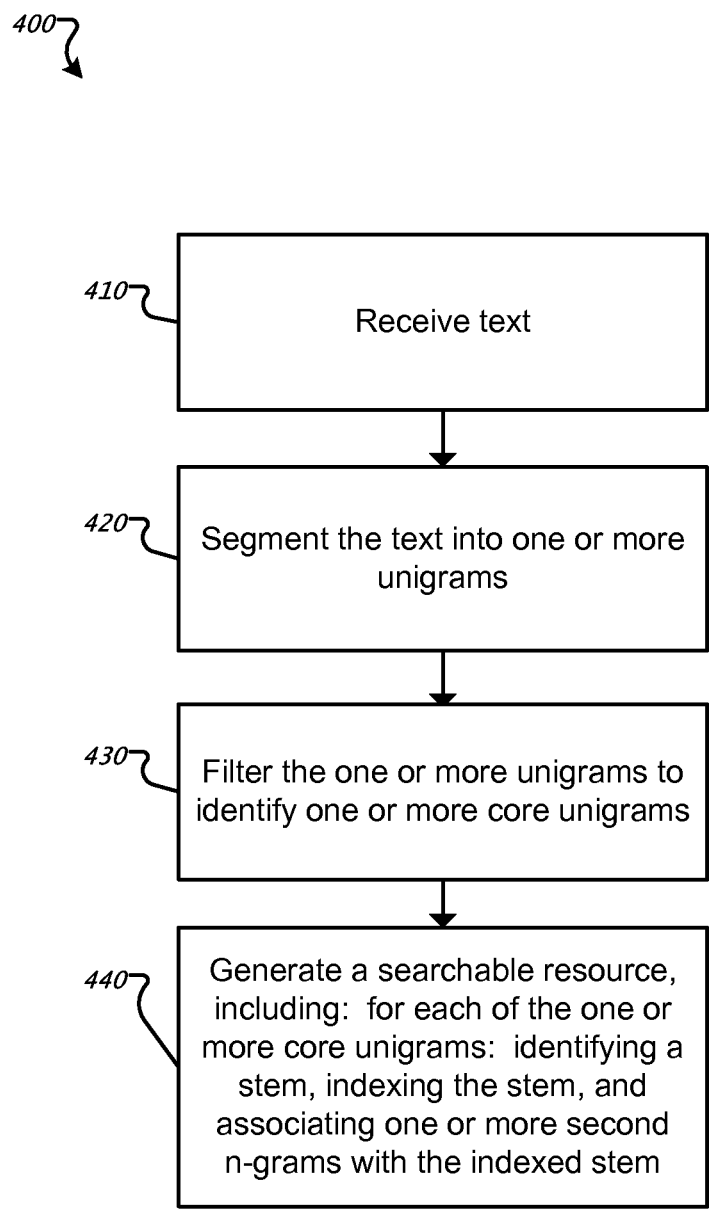
FIG. 4 is a flow chart showing an example process for segmenting text for indexing.

FIG. 4 is a flow chart showing an example process 400 for segmenting text for indexing. For convenience, the segmentation of text for indexing will be described with respect to a system that performs the segmentation. The system receives 410 text. For example, the system can receive one or more sources of text, e.g., one or more glossaries or parallel corpora. The system segments 420 the text into one or more unigrams. In some implementations, the system first segments the text (e.g., into n-grams) to be associated with n-gram sets. Then, for each n-gram set, the system segments the n-grams into one or more unigrams. For example, the system can use statistical analysis (e.g., probabilities of the n-grams being words), dictionaries, or manual analysis to segment the text into one or more unigrams. The system filters 430 the one or more unigrams to identify one or more core unigrams. For example, the system can use a stop list to filter out stop-words to identify the one or more core unigrams.

The system generates 440 a searchable resource. For each of the one or more core unigrams, the system identifies a stem, indexes the stem, and associates one or more second n-grams with the indexed stem. For example, the system can identify the stem by using stemming techniques (e.g., brute force, suffix stripping, lemmatization, stochastic techniques). In addition, the system can use a hashing technique to index the stem. The system can derive each of the one or more second n-grams from the text. Each of the one or more second n-grams includes a core unigram that is related to the indexed stem. For example, the system generates a glossary or dictionary from the indexed stems and associated second n-grams.

Returning to the example in FIG. 1, the system receives the sentence (an 8-gram), and as a further example, first segments the sentence to produce an n-gram "spill the beans". The n-gram "spill the beans" is associated with a first n-gram set (e.g., n-gram set 210). As another example, "scientist" is associated with a second n-gram set. Returning to the first example, the system segments "spill the beans" into the unigrams "spill", "the", and "beans". Then, the system filters out the stop-words, thereby removing "the". The system identifies the stems of "spill" and "beans" as "spill" and "bean", respectively. The system indexes "spill" and "bean", and associates "spill the beans" with "spill" and "bean" in the index in the second data structure, for example. Temporarily referring to FIG. 2, an index (e.g., row key) and an associated row is generated for "spill the beans". The information (e.g., 310-370) in the n-gram subset is also populated. In this example, the term 310 is "spill the beans", the stem 320 is "spill the bean", the grammar information 330 is a tag that indicates an idiom, and the language information 340 is "en-US".

After the first data structure (and the second data structure) are generated, the first data structure and the second data structure can also be searched using information obtained from text data. In general, the text data is similarly segmented into unigrams.

Figure 5:
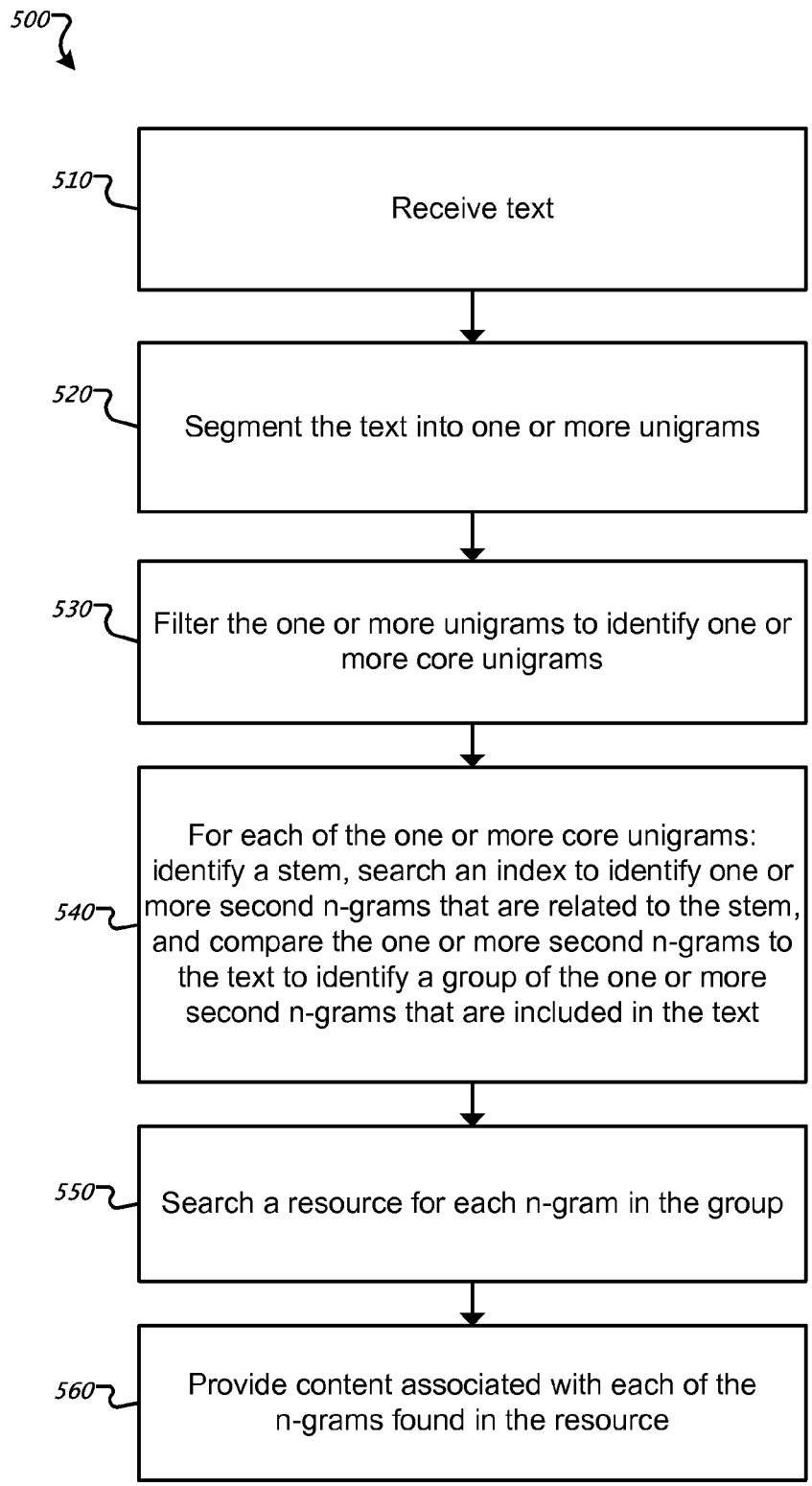
FIG. 5 is a flow chart showing another example process for segmenting text for searching.

FIG. 5 is a flow chart showing another example process 500 for segmenting text for searching. For convenience, the segmentation of text for searching will be described with respect to a system that performs the segmentation. The system receives 510 text. For example, the system can receive a source of text, e.g., a web page, or document, to be translated that includes the text. The system segments 520 the text into one or more unigrams. For example, the system can use statistical analysis (e.g., probabilities of the n-grams being words), dictionaries, or manual analysis to segment the text into one or more unigrams. The system filters 530 the one or more unigrams to identify one or more core unigrams. For example, the system can use a stop list to filter out stop-words to identify the one or more core unigrams.

For each of the one or more core unigrams, the system identifies 540 a stem, searches an index to identify one or more second n-grams that are related to the stem, and compares the one or more second n-grams to the text to identify a group of the one or more second n-grams that are included in the text. For example, the system can identify the stem by using stemming techniques (e.g., brute force, suffix stripping, lemmatization, stochastic techniques). In some implementations, a second data structure is used as an index, as described previously. For a unigram (e.g., a term from an observed sequence of terms), duplicate row keys of one or more first data structures can be retrieved from the second data structure. Duplicates of a row key can be removed before identifying n-gram sets in the one or more first data structures, resulting in the identification of each n-gram set only once. In addition, the group of one or more second n-grams can include n-grams that are duplicates. Duplicate n-grams can be removed from the group of one or more second n-grams before comparing the unique second n-grams in the group to the text to determine if any of the unique second n-grams are included in the text.

Furthermore, the system searches 550 a resource for each n-gram in the group, and provides 560 content associated with each of the n-grams found in the resource. For example, the system searches a glossary for each n-gram in the group, and provides images, audio, video, text, or documents associated with each of the n-grams found in the resource. Furthermore, information (e.g., translations) associated with any of the one or more second n-grams that are included in the text can be provided.

Returning to the example in FIG. 1, the system receives the sentence, and as a further example, segments the sentence into the unigrams "alleged", "scientist", "says", "he", "will", "spill", "the", and "beans". Then, the system filters out stop-words, thereby removing "says", "he", "will, and "the". The system identifies the stems of "alleged", "scientist", "spill", and "beans" as "allege", "scientist", "spill" and "bean", respectively. The system searches an index and may identify "allege"; "scientist" and "prominent scientist"; "spill the beans" (for the stem "spill"); "bean" and "spill the beans" (for the stem "bean"). Note that duplicate results of "spill the beans" can be identified by the system. For example, "spill the beans" can be associated with the stem "spill" and with the stem "bean". In some implementations, the system removes a duplicate of "spill the beans".

The system compares "allege", "scientist", "prominent scientist", "spill", "bean" and "spill the beans" with the sentence and determines that "allege", "scientist", "spill", "bean", and "spill the beans" are included in the sentence. In some implementations, the system compares the identified n-grams to a stemmed sentence, e.g., a stemmed representation of the sentence. For example, the system can compare "allege", "scientist", "prominent scientist", "spill", "bean", and "spill the bean" to the stemmed sentence "allege scientist say he will spill the bean".

In some implementations, the system provides information (e.g., content including, for example, images, audio, video, text, or documents, stored in additional information 370) associated with entries for "allege", "scientist", "spill", "bean", and "spill the beans".

For example, in a translation context, if a target language is provided, the system can return n-gram subsets (and related information) that are associated with the target language (e.g., stored in language information 340). Temporarily referring to FIG. 2, if the n-gram set 210 is associated with "bean", for example, a translation is facilitated by returning n-gram subsets 222 that are associated with the target language (e.g., as indicated by language information included in n-gram element 224).

The subject matter described in this specification can be used in various applications. For example, the systems and techniques described in this specification can be advantageous for use in information retrieval. Resources, e.g., dictionaries and glossaries, can be generated from training data and searched using the described systems and techniques. Generating resources from text data and searching the resources can be used in applications, including, for example, translating text from one language to another language (e.g., manual translation, machine translation), transliterating text from one writing system to another writing system, detecting plagiarism, and data mining (e.g., finding information including, for example, definitions, synonyms, images, and related documents). Other implementations and applications are possible.

Figure 6:
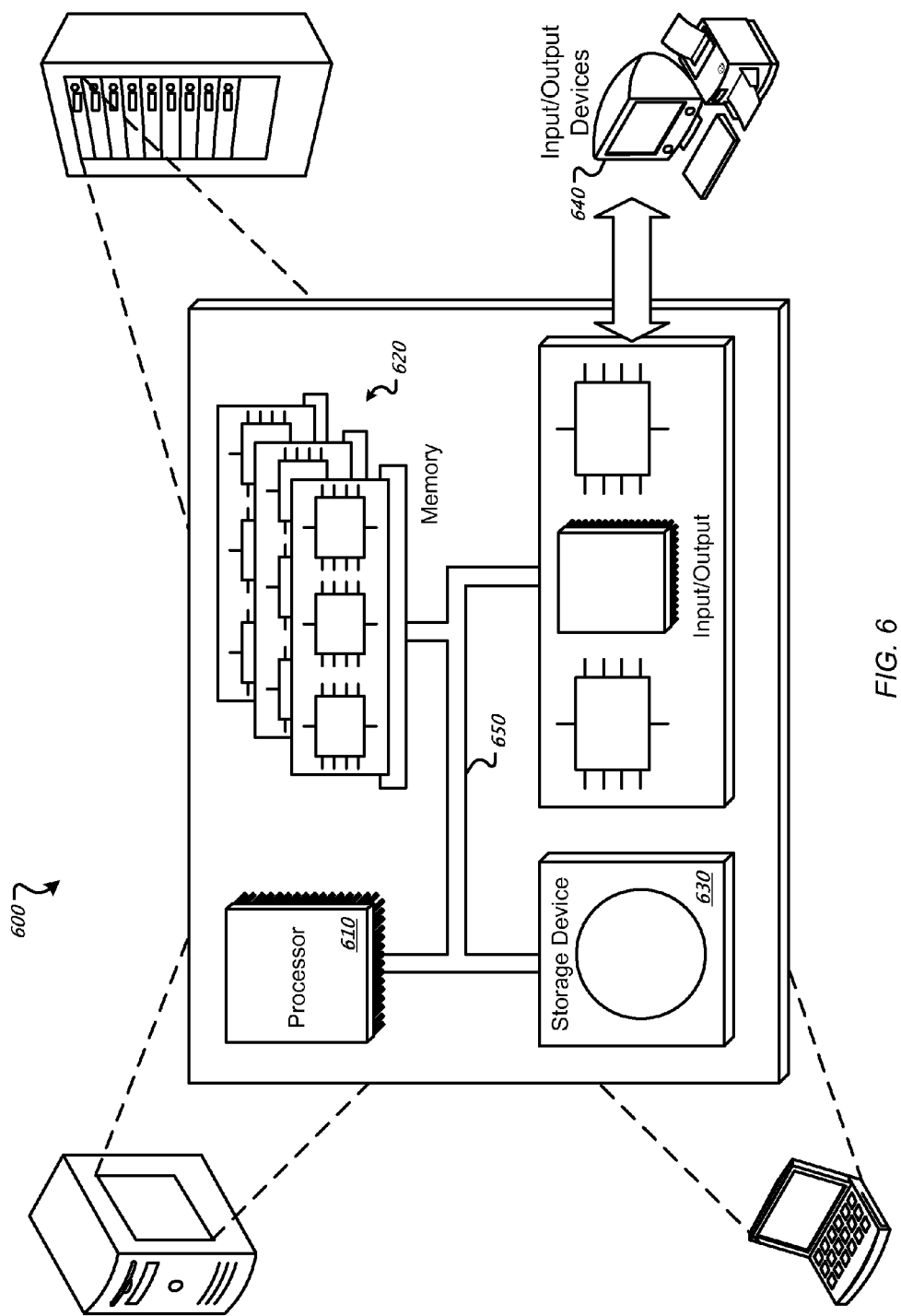
FIG. 6 is a schematic diagram of a generic computer system.

FIG. 6 is a schematic diagram of a generic computer system 600. The system 600 can be used for practicing operations described in association with the techniques described previously (e.g., processes 400 and 500). The system 600 can include a processor 610, a memory 620, a storage device 630, and input/output devices 640. Each of the components 610, 620, 630, and 640 are interconnected using a system bus 650. The processor 610 is capable of processing instructions for execution within the system 600. Such executed instructions can implement one or more components of a system, for segmenting text for searching as in FIGS. 4 and 5, for example. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 is a computer readable medium including, for example, volatile or non-volatile that stores information within the system 600. The memory 620 could store the data structure 200, for example. The storage device 630 is capable of providing persistent storage for the system 600. The storage device 630 may be a floppy disk device, a hard disk device, an optical disk device, or a tape device, or other suitable persistent storage means. The input/output device 640 provides input/output operations for the system 600. In one implementation, the input/output device 640 includes a keyboard and/or pointing device. In another implementation, the input/output device 640 includes a display unit for displaying graphical user interfaces.

The input/output device 640 can provide input/output operations for a system, for segmenting text for searching as in FIGS. 4 and 5. The segmentation system can include computer software components to segment text for searching. Examples of such software components include a segmentation engine to segment first n-grams into one or more unigrams, a filtering engine to identify core unigrams, a stemming engine to identify stems of the core unigrams; an indexing engine to index the stems, a searching engine to search the index, and a comparison engine to associate second n-grams with indexed stems or compare the second n-grams to the first n-grams. Such software components can be persisted in storage device 630, memory 620 or can be obtained over a network connection, to name a few examples.

An electronic document (which for brevity was simply referred to as a document) does not necessarily correspond to a file. A document may be stored in a portion of a file that holds other documents, in a single file dedicated to the document in question, or in multiple coordinated files.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, at a computer system comprising a processor, text;
segmenting, at the computer system, the text into one or more unigrams;
filtering, at the computer system, the one or more unigrams to identify one or more core unigrams; and
generating, at the computer system, a searchable data structure, wherein the generating includes, for each specific unigram of the one or more core unigrams:
identifying a stem of the specific unigram,
indexing the stem,
obtaining (i) grammar information for the specific unigram, (ii) language information for the specific unigram, and (iii) description information for the specific unigram, and
associating one or more n-grams with the indexed stem,
wherein each of the one or more n-grams is derived from the text, the grammar information for the specific unigram, the language information for the specific unigram, and the description information for the specific unigram, and
wherein each of the one or more n-grams includes a core unigram that is related to the indexed stem.

2. The computer-implemented method of claim 1, further comprising:
  associating, at the computer system, a content with the one or more n-grams, wherein the content includes an image, audio, video, text, or a document.

3. The computer-implemented method of claim 1, wherein the grammar information includes information for distinguishing between different lexical categories that the specific unigram belongs to,
  wherein the language information includes information indicative of a language of the specific unigram, and
  wherein the description information includes at least one of (i) user-generated information describing the specific unigram and (ii) information generated by the computer system that describes the specific unigram.

4. The computer-implemented method of claim 1, wherein the searchable data structure includes first and second distinct data structures,
  wherein the first data structure includes, for each specific unigram of the one or more core unigrams, (i) the grammar information for the specific unigram, (ii) the language information for the specific unigram, and (iii) the description information for the specific unigram,
  wherein the second data structure includes the indexes for the stems of the one or more core unigrams and is used as an index for the first data structure.

5. The computer-implemented method of claim 1, further comprising:
  receiving, at the computer system, a first n-gram and a request to search the searchable data structure using the first n-gram;
  searching, at the computer system, the searchable data structure to obtain one or more second n-grams related to the first n-gram; and
  outputting, at the computer system, the one or more second n-grams.

6. A computer-implemented method comprising:
  receiving, at a computer system comprising a processor, text;
  segmenting, at the computer system, the text into one or more unigrams;
  filtering, at the computer system, the one or more unigrams to identify one or more core unigrams, wherein the filtering includes, for each specific unigram of the one or more core unigrams:
    identifying a stem of the specific unigram,
    searching an index to identify one or more n-grams that are related to the stem, wherein the index includes (i) grammar information for the specific unigram, (ii) language information for the specific unigram, and (iii) description information for the specific unigram, and
    comparing the one or more n-grams to the text to identify a group of the one or more n-grams that are included in the text;
  searching, at the computer system, a searchable data structure for each n-gram in the group; and
  providing, at the computer system, a content associated with each of the n-grams found in the searchable data structure, wherein the content includes an image, audio, video, text, or a document.

7. The computer-implemented method of claim 6, further comprising:
  stemming, at the computer system, the text before comparing the one or more n-grams to the text; and
  removing, at the computer system, duplicates of each of the one or more n-grams before comparing the one or more n-grams to the text.

8. The computer-implemented method of claim 6, wherein the grammar information includes information for distinguishing between different lexical categories that the specific unigram belongs to,
  wherein the language information includes information indicative of a language of the specific unigram, and
  wherein the description information includes at least one of (i) user-generated information describing the specific unigram and (ii) information generated by the computer system that describes the specific unigram.

9. A computer program product, encoded on a tangible program carrier, operable to cause a data processing apparatus to perform operations comprising:
  receiving text;
  segmenting the text into one or more unigrams;
  filtering the one or more unigrams to identify one or more core unigrams; and
  generating a searchable data structure, wherein the generating includes, for each specific unigram of the one or more core unigrams:
    identifying a stem of the specific unigram,
    indexing the stem,
    obtaining (i) grammar information for the specific unigram, (ii) language information for the specific unigram, and (iii) description information for the specific unigram, and
    associating one or more n-grams with the indexed stem,
    wherein each of the one or more n-grams is derived from the text, the grammar information for the specific unigram, the language information for the specific unigram, and the description information for the specific unigram, and
    wherein each of the one or more n-grams includes a core unigram that is related to the indexed stem.

10. The computer program product of claim 9, operable to cause the data processing apparatus to perform operations further comprising:
  associating a content with the one or more n-grams, where the content includes an image, audio, video, text, or a document.

11. The computer program product of claim 9, wherein the grammar information includes information for distinguishing between different lexical categories that the specific unigram belongs to,
  wherein the language information includes information indicative of a language of the specific unigram, and
  wherein the description information includes at least one of (i) user-generated information describing the specific unigram and (ii) information generated by the data processing apparatus that describes the specific unigram.

12. The computer program product of claim 9, wherein the searchable data structure includes first and second distinct data structures,
  wherein the first data structure includes, for each specific unigram of the one or more core unigrams, (i) the grammar information for the specific unigram, (ii) the language information for the specific unigram, and (iii) the description information for the specific unigram,
  wherein the second data structure includes the indexes for the stems of the one or more core unigrams and is used as an index for the first data structure.

13. The computer program product of claim 9, wherein the operations further include:

receiving a first n-gram and a request to search the searchable data structure using the first n-gram;

searching the searchable data structure to obtain one or more second n-grams related to the first n-gram; and outputting the one or more second n-grams.

14. A computer program product, encoded on a tangible program carrier, operable to cause a data processing apparatus to perform operations comprising:

receiving text;

segmenting the text into one or more unigrams;

filtering the one or more unigrams to identify one or more core unigrams, wherein the filtering includes, for each specific unigram of the one or more core unigrams:

identifying a stem of the specific unigram, searching an index to identify one or more n-grams that are related to the stem, wherein the index includes (i) grammar information for the specific unigram, (ii) language information for the specific unigram, and (iii) description information for the specific unigram, and comparing the one or more n-grams to the text to identify a group of the one or more n-grams that are included in the text;

searching a searchable data structure for each n-gram in the group; and providing a content associated with each of the n-grams found in the searchable data structure, wherein the content includes an image, audio, video, text, or a document.

15. The computer program product of claim 14, operable to cause the data processing apparatus to perform operations further comprising:

stemming the text before comparing the one or more n-grams to the text; and removing duplicates of each of the one or more n-grams before comparing the one or more n-grams to the text.

16. The computer program product of claim 14, wherein the grammar information includes information for distinguishing between different lexical categories that the specific unigram belongs to, wherein the language information includes information indicative of a language of the specific unigram, and wherein the description information includes at least one of (i) user-generated information describing the specific unigram and (ii) information generated by the data processing apparatus that describes the specific unigram.

17. A computer-implemented method, comprising:

receiving, at a computer system including a processor, a training data including a plurality of n-grams, wherein each of the plurality of n-grams includes one or more words;

filtering, at the computer system, the training data by removing stop-words to obtain a modified training data;

generating, at the computer system, a first data structure using the modified training data, the data structure including one or more sets of n-grams, each having one or more subsets of n-grams, wherein the data structure further includes, for each specific n-gram:

(i) a stem of the n-gram, (ii) grammar information for the specific n-gram, (iii) language information for the specific n-gram, and (iv) description information for the specific n-gram;

indexing, at the computer system, the first data structure according to the stems of the n-grams to obtain a searchable data structure;

receiving, at the computer system, a first n-gram and a request to search the searchable data structure using the first n-gram;

searching, at the computer system, the searchable data structure to obtain one or more second n-grams related to the first n-gram; and outputting, at the computer system, the one or more second n-grams.

18. The computer-implemented method of claim 17, wherein the first data structure includes one or more rows, each having one or more columns, wherein each of the one or more rows corresponds to an n-gram set and is indexed by a row key that includes a string of text generated and indexed by a hash technique, and wherein each of the one or more columns includes a protocol buffer that is associated with a single language.

19. The computer-implemented method of claim 18, wherein the searchable data structure is a second data structure that is distinct from the first data structure, and wherein searching the searchable data structure to obtain the one or more second n-grams related to the first n-gram includes using the second data structure as an index for the first data structure to reverse map the first n-gram to one or more row keys of the first data structure to obtain the one or more second n-grams.

20. The computer-implemented method of claim 17, wherein the grammar information includes information for distinguishing between different lexical categories that the specific n-gram belongs to, wherein the language information includes information indicative of a language of the specific n-gram, and wherein the description information includes at least one of (i) user-generated information describing the specific n-gram and (ii) information generated by the computer system that describes the specific n-gram.

* * * * *